(12) United States Patent
Hamidi

(10) Patent No.: US 7,561,382 B2
(45) Date of Patent: Jul. 14, 2009

(54) REUSABLE ESD SHORTING MEMBER AND CABLE

(75) Inventor: Hoodin Hamidi, Pleasant Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 10/985,415

(22) Filed: Nov. 10, 2004

(65) Prior Publication Data

US 2006/0098350 A1    May 11, 2006

(51) Int. Cl.
*G11B 5/127* (2006.01)
(52) U.S. Cl. ...................................... 360/323
(58) Field of Classification Search ............... 360/323, 360/234.5
See application file for complete search history.

(56) References Cited

U.S. PATENT DOCUMENTS

| | | | |
|---|---|---|---|
| 5,465,186 A * | 11/1995 | Bajorek et al. | 360/323 |
| 5,599,205 A | 2/1997 | Cronin | 439/507 |
| 5,644,454 A | 7/1997 | Arya et al. | 360/106 |
| 5,710,682 A | 1/1998 | Arya et al. | 360/106 |
| 5,746,621 A | 5/1998 | Cronin | 439/507 |
| 5,812,357 A | 9/1998 | Johansen et al. | 361/212 |
| 5,877,933 A | 3/1999 | Johansen et al. | 361/220 |
| 6,034,851 A | 3/2000 | Zarouri et al. | 360/137 |
| 6,507,467 B1 * | 1/2003 | Schadewald et al. | 360/323 |
| 6,518,521 B1 * | 2/2003 | Marek et al. | 200/16 D |
| 6,687,097 B1 * | 2/2004 | Anderson et al. | 360/323 |
| 7,161,772 B2 * | 1/2007 | Iben | 360/323 |
| 2002/0075610 A1 | 6/2002 | Schadewald, Jr. et al. | 360/323 |
| 2008/0055788 A1 * | 3/2008 | Nagai | 360/323 |

* cited by examiner

*Primary Examiner*—Allen T Cao
(74) *Attorney, Agent, or Firm*—Zilka-Kotab, PC

(57) ABSTRACT

A mechanism for protecting an electronic component from electrostatic discharge (ESD) damage. The system includes a cable adapted for coupling to an electronic device, the cable having multiple traces therein adapted for electrical communication with components of the electronic device. The cable has a window therein positioned between opposite ends of the cable. Portions of the traces are exposed in the window. A protective member is insertable in the window of the cable, the protective member having a conductive portion engaging the traces of the cable when inserted in the window of the cable for creating a short between at least some of the traces.

30 Claims, 9 Drawing Sheets

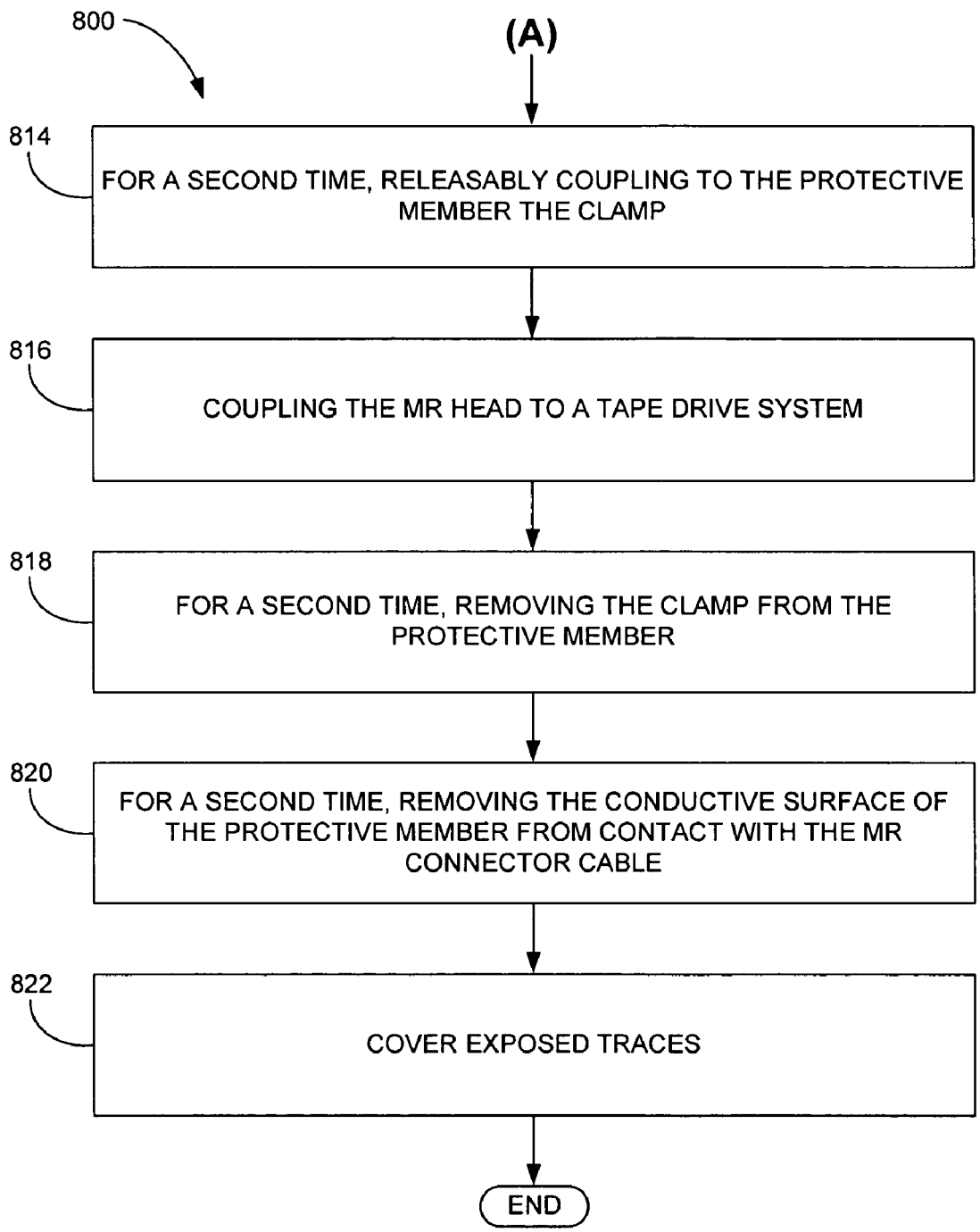
FIG. 8 (contd.)

REUSABLE ESD SHORTING MEMBER AND CABLE

FIELD OF THE INVENTION

The present invention relates to a device for affording protection from electrostatic discharge and electrical overstress, and more particularly, this invention relates to using a shorting bar for protecting an electronic device from electrostatic discharge and electrical overstress.

BACKGROUND OF THE INVENTION

Magnetic head-based systems have been widely accepted in the computer industry as a cost-effective form of data storage. In a magnetic tape drive system, a magnetic tape containing a multiplicity of laterally positioned data tracks that extend along the length of the tape is drawn across a magnetic read/write transducer, referred to as a magnetic tape head. The magnetic tape heads can record and read data along the length of the magnetic tape surface as relative movement occurs between the heads and the tape. Because magnetic tape is a flexible media, its lateral position fluctuates as the tape is pulled at high speeds across the tape head. In order to maintain alignment of the read sensors or writing transducers along the tracks, the tape head is moved (actuated) laterally to follow the tape fluctuations as the high speed lateral response, termed actuation, is better achieved with lighter tape heads.

In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk on a spring-loaded support arm known as the actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing. The flying height of the magnetic head over the disk surface is typically only a few tens of nanometers or less and is primarily a function of disk rotation, the aerodynamic properties of the slider assembly and the force exerted by the spring-loaded actuator arm.

Magnetoresistive (MR) sensors are particularly useful as read elements in magnetic heads, used in the data storage industry for high data recording densities. Two examples of MR materials used in the storage industry are anisotropic magnetoresistive (AMR) and giant magnetoresistive (GMR). MR and GMR sensors are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads.

To achieve the high areal densities required by the data storage industry, the sensors are made with commensurately small dimensions. The smaller the dimensions, the more sensitive the thin sheet resistors become to damage from spurious current or voltage spike.

A major problem that is encountered during manufacturing, handling and use of MR sheet resistors as magnetic recording transducers is the buildup of electrostatic charges on the various elements of a head or other objects which come into contact with the sensors, particularly sensors of the thin film type, and the accompanying spurious discharge of the static electricity thus generated. Static charges may be externally produced and accumulate on instruments used by persons performing head manufacturing or testing function. These static charges may be discharged through the head causing excessive heating of the sensitive sensors which result in physical or magnetic damage to the sensors.

As described above, when a head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for magnetic tape media (order of 25 Mbytes/cm$^2$) are patterned as resistive sheets of MR and accompanying materials, and will have a combined thickness for the sensor sheets on the order of 500 Angstroms (Å) with a width of 1 to 10 microns ($\mu$m) and a height on the order of 1 $\mu$m. Sensors used in extant disk drives are even smaller. Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded. Short time current or voltage pulses which cause extensive physical damage to a sensor are termed electrostatic discharge (ESD) pulses.

While a disk head is comprised of a single MR element, modern tape heads have multiple MR elements, on the order of 8 to 32, or even more, all of which must be fully functional. The large number of MR sensors in a tape drive and the requirement that all are functional, makes ESD loss due to a single element very expensive as the entire head must then be scrapped. Testing during manufacturing is important in order to eliminate damaged components early in the process to minimize cost by avoiding processing of damaged parts.

Prior solutions to ESD protection can be summarized into two types of approaches: 1) by using diode(s) and 2) by shorting out the sensor element. Both of these approaches have significant disadvantages. Electrically shorting out the MR sensors, by shorting the two ends of the sensor which connect to external devices, provides the best possible ESD protection. However, approaches heretofore devised have required either semi-permanent shorting such as removable soldering or specialized and expensive components. For instance, U.S. Pat. No. 6,507,467 to Schadewald, Jr. et al. requires implementation of a specialized connector board to which a shunting member is inserted.

In the diode approach, the diode is intended to remain in parallel with the sensor element during normal operation of the disk (or tape) drive. Potential problems with the diode approach are: 1) drainage of current under normal operation degrading the sensor performance, 2) excessive weight of the diode package affecting mechanical motion of the tape head, 3) excessive cost of adding a multiplicity of diodes, 4) physically being able to fit a multiplicity of diodes onto a cable, and 5) space constraints within a small tape drive.

For example, one method used in the hard disk drive industry is to use a diode package containing a pair of diodes connected in parallel across the MR element, each diode pointing in the opposite forward bias direction, (crossed diodes) to protect the MR device. This has not been implemented in tape drives due to cost and size issues. Particularly, since modern tape heads have multiple read elements, it can be expensive to add packages containing individual diodes or pairs of diodes for each element, particularly when the head and cable are scrapped during the testing phase. While mounting diodes on a single slider may be cost effective, the sheer number of diodes required for a modern tape head can add significant cost to the head.

A need therefore exists for providing ESD protection for a multiplicity of read and/or write head assemblies which has a low cost and is easy to implement.

SUMMARY OF THE INVENTION

The present invention provides a system for protecting an electronic device such as a MR device, from electrostatic discharge (ESD) damage. The system includes a cable adapted for coupling to an electronic device, the cable having multiple traces therein adapted for electrical communication with components of the electronic device. The cable has a window therein positioned between opposite ends of the cable. Portions of the traces are exposed in the window. A protective member is insertable in the window of the cable, the protective member having a conductive portion engaging the traces of the cable when inserted in the window of the cable for creating a short between at least some of the traces.

By shorting the traces coupled to the electronic component, an electrical path is created that has much less resistance than the electronic device itself. Since electrical charge follows the path of least resistance, it will favor following the path across the protective member rather than the costly and sensitive electronic device.

Another major advantage is that the cable contact pads can be connected to equipment for testing while the protective member is still attached. This allows the operator to have a cabled device with the connector end exposed without worry of introducing an external voltage to the electronic device. Once the device is safely connected to the testing apparatus, the protective member is then removed for allowing the testing to take place. Thus, the device can be protected at all times.

A clamp can be included to detachably couple the protective member to the cable. As an alternative, the protective member can include an integrated clamping portion, which may optionally include a hinge and/or a catch for locking the protective member to the cable.

The conductive portion can be formed of any type of conductive material, and preferably includes a noncorrosive material. The protective member can have many configurations. In one embodiment, the protective member is a solid bar of conductive material. In another embodiment, the protective member includes a nonconductive portion, the conductive portion being coupled to the nonconductive portion. In a further embodiment, the conductive portion of the protective member is a noncorrosive material plated on a core. In yet another embodiment, the conductive portion of the protective member is a woven mesh. The woven mesh can further be coupled to a resiliently deformable material. In an even further embodiment, the protective member includes an adhesive portion for adhering the protective member to the cable. As an option, the protective member may include a layer of ESD dissipative material thereon.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present description discloses a protective device for protecting components of an electronic device from ESD damage. Although the invention is described as embodied for use with a magnetic tape storage system, the invention also applies to other electronic devices, including magnetic recording systems and applications using a sensor to detect a magnetic field.

Figure 1:
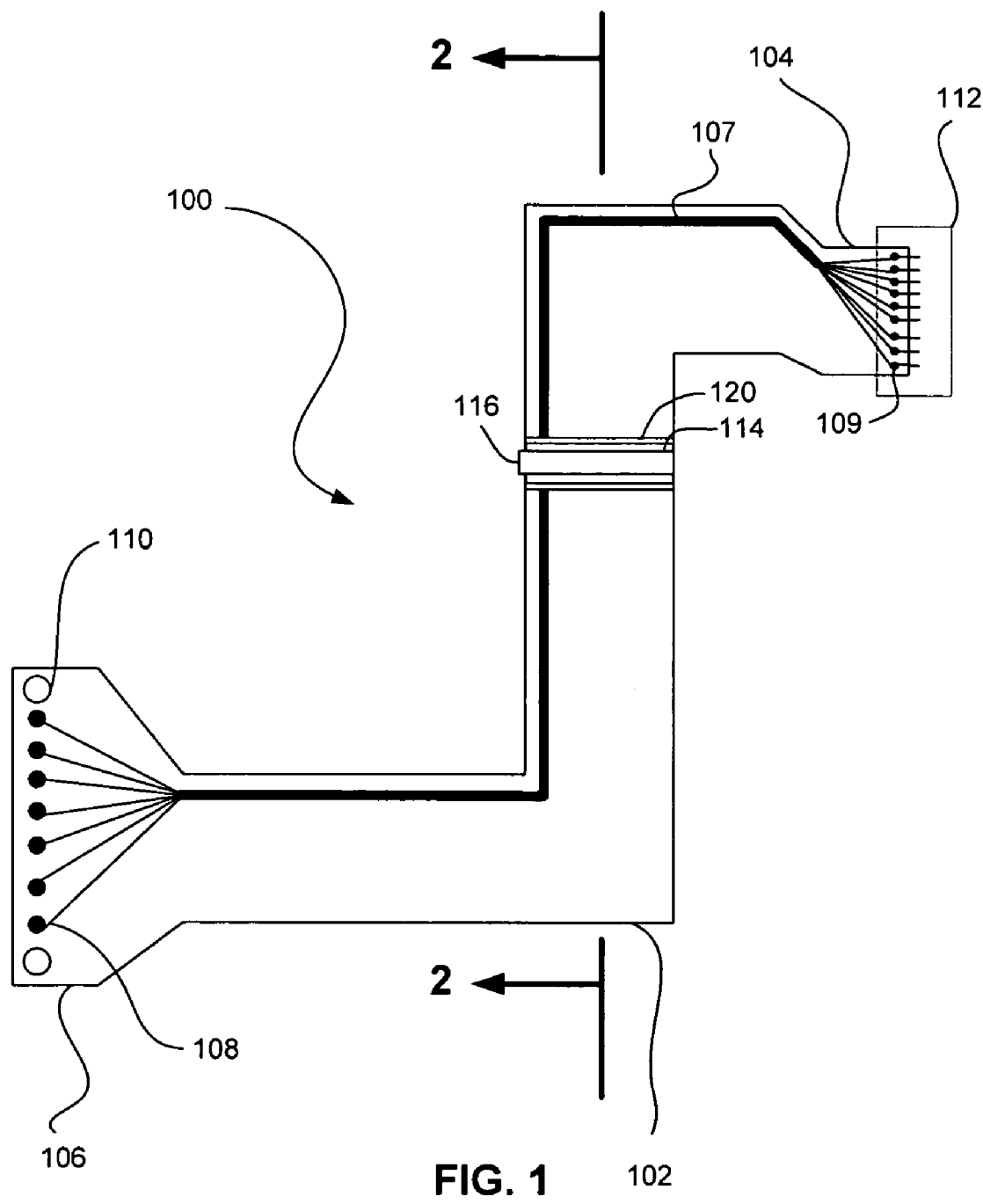
FIG. 1 illustrates a system for protecting a magnetoresistive (MR) head from damage caused by electrostatic discharge, in accordance with one embodiment.

FIG. 1 illustrates a system 100 for protecting a magnetoresistive (MR) head (or other electronic component) from damage caused by electrostatic discharge (ESD), in accordance with one embodiment. As shown, included is a MR connector cable 102 having a substantially planar configuration, and primarily constructed from a flexible plastic material. As shown in FIG. 1, the MR connector cable 102 includes a first end 104 and a second end 106 with a plurality of traces 107 therein for carrying an electrical current. Both the first end 104 and second end 106 include a plurality of contacts 109 and 108, respectively, coupled to the traces.

Further provided is a MR head 112 coupled to the first end 104 of the MR connector cable 102 in electrical communication with the bonding contacts 109 thereof. The second end 106 is adapted for being coupled to a control assembly in the form of a printed circuit board or the like for communicating control signals between the MR head 112 and the control assembly. To facilitate the coupling between the MR connector cable 102 and the control assembly, the MR connector cable 102 is equipped with a pair of spaced apertures 110 for engaging a pair of control assembly inserts (not shown).

In one embodiment, the MR connector cable 102 may include a tape drive compression cable or the like. In the context of the present description, however, the MR connector cable 102 may refer to any cable capable of communicating signals with the MR head 112 (which could be designed as a component of a tape or hard drive system).

Before the coupling between the MR connector cable 102 and the control assembly is carried out, the MR head 112 may be subjected to ESD exposure during the manufacture process, testing, and transportation process. Traditionally, such exposure to ESD is applied to the MR head 112 via the exposed contacts of the second end 106 of the MR connector cable 102 or to the exposed MR head 112 on the air bearing surface.

To protect the MR head 112 from damage associated with ESD in accordance with a first embodiment, a conductive protective member 114 is provided. The protective member 114 creates an electrical short between the traces 107.

Figure 2:
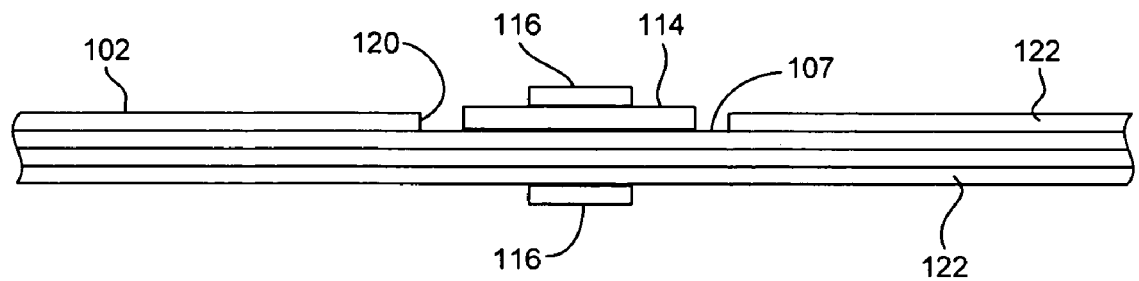
FIG. 2 illustrates a side cross-sectional view of the various components of the system of FIG. 1, taken along line 2-2 of FIG. 1.

To provide access to the traces 107, the MR connector cable 102 has a window 120 therein into/over which the protective member 114 is inserted. FIG. 2 illustrates the positioning of the protective member 114 in the window 120 of the cable 102. As shown, the traces 107 are encapsulated by an insulating material 122 (typically polyimide), except at the window 120. The window 120 can be formed in the insulating material 122 prior to lamination onto the cable 102.

Further provided is a clamp 116 for clamping the protective member 114 to the exposed traces 107 in the window 120 of the MR connector cable 102. In use, the protective member 114 and the clamp 116 are capable of being re-used with a plurality of different MR connector cables 102.

By shorting the traces 107 coupled to the MR element 112, an electrical path is created that has much less resistance than the MR element itself. Since electrical charge follows the path of least resistance, it will favor following the path across the protective member 114 rather than the costly and sensitive element 112. Another major advantage is that the cable contact pads 108 can be connected to equipment for testing while the protective member 114 is still attached. This allows the operator to have a cabled head with the connector end 106 exposed without worry of introducing an external voltage to the MR sensor 112. Once the head is safely connected to the testing apparatus, the protective member 114 is then removed for allowing the testing to take place. Thus, the head can be protected at all times.

Figure 3A:
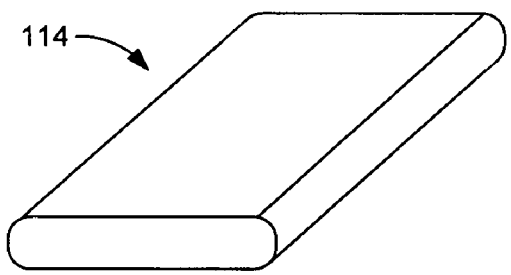
FIGS. 3A-F depict various embodiments of a protective device.
Figure 3B:
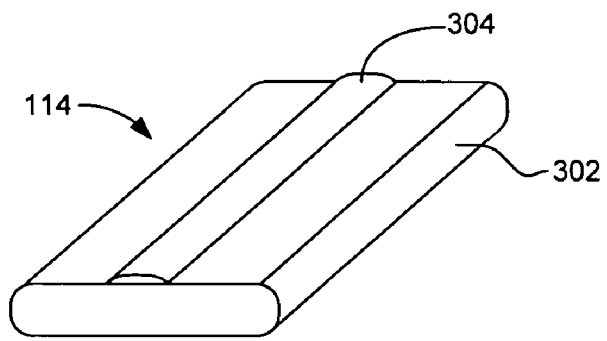
Figure 3C:
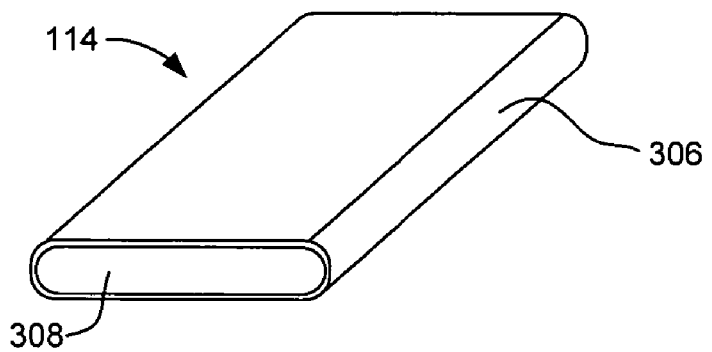

The protective member 114 can be constructed of any electrically conductive material. FIG. 3A illustrates a protective member 114 constructed as a solid bar of metal such as copper, gold, stainless steel, etc. FIG. 3B illustrates a protective member 114 having a nonconductive portion 302 and a conductive portion 304 that engages the traces 107. By providing a nonconductive portion 302, the likelihood of an electrical charge being passed from the hands of the user to the traces 107 is greatly reduced. FIG. 3C illustrates the cross section of another design of the protective member 114, this design having a plated conductive portion 306 surrounding a core 308.

Because the protective member 114 is reusable, the conductive portion of the protective member 114 can be constructed of a more expensive noncorrosive metal, such as gold, stainless steel, etc. The embodiments shown in FIGS. 3B and 3C reduce the overall cost, as only the trace engaging portion of the protective member 114 need be constructed of the more expensive material.

Figure 3D:
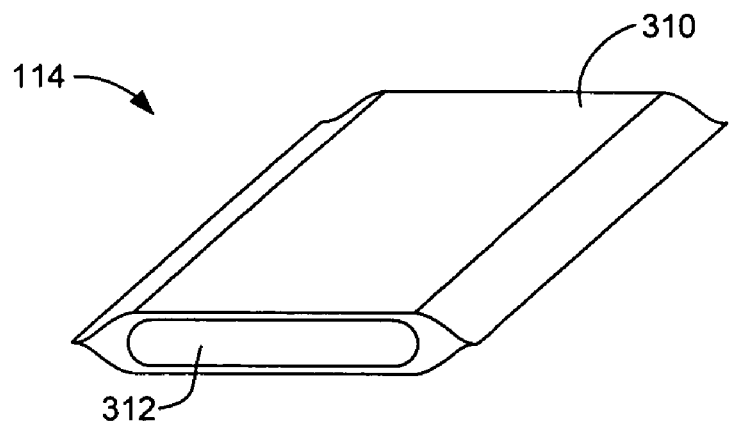

FIG. 3D illustrates a protective member 114 that includes a conductive layer 310 comprising a woven mesh of conductive fibers. In one embodiment, the conductive fibers may include copper or conductive stainless steel. Moreover, gold or some other non-corrosive material may be used in combination with the copper to prevent the layer 310 from corroding. Moreover, a center core 312 may be formed of a resiliently deformable material, such as an elastomeric material, foam, etc. In one embodiment, the core 312 may be formed of any static dissipative material or any other desired composition.

Figure 3E:
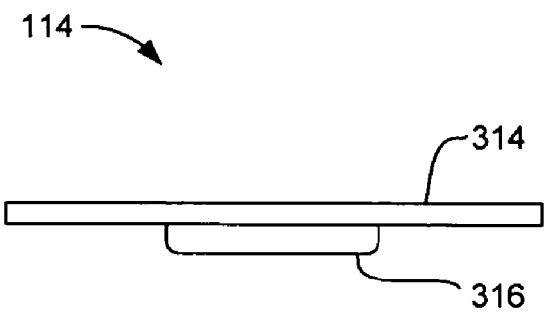
Figure 3F:
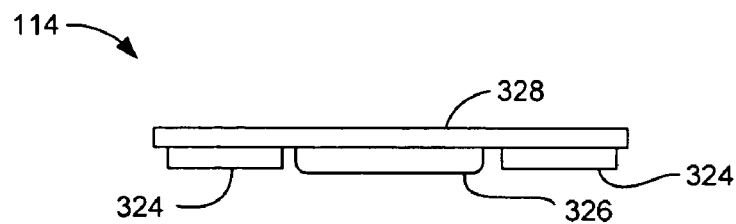
Figure 4:
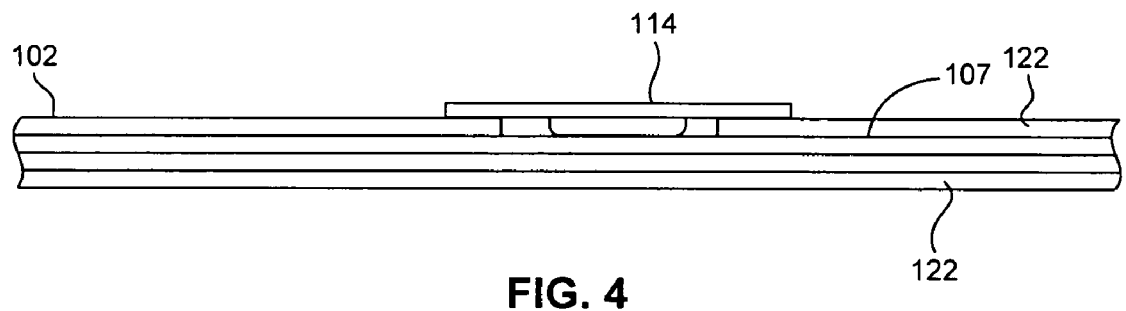
FIG. 4 is a partial side view of the system implementing a protective member having an adhesive according to one embodiment.
Figure 5:
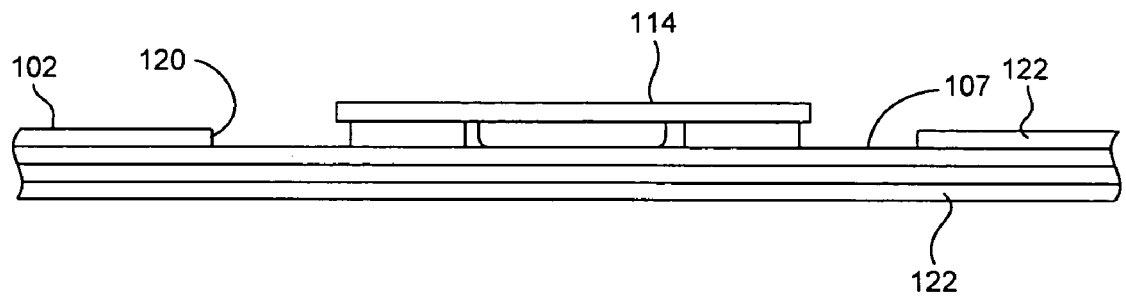
FIG. 5 is a partial side view of the system implementing a protective member having an adhesive according to another embodiment.

FIG. 3E illustrates yet another variation of the protective member 114. This embodiment includes an adhesive portion 314 that couples a conductive portion 316 to the exposed traces 107. The adhesive portion 314 can couple to portions of the cable 102 adjacent the window 120, as shown in FIG. 4. This would obviate the need for a clamp 116. FIG. 3F depicts another variation of the protective member 114 having a pair of adhesive strips 324 on a substrate 328 and flanking a conductive portion 326. Preferably, the conductive portion 326 extends slightly further from the substrate 328 than the adhesive strips 324 to create a biasing of the conductive portion 326 towards the traces 107. Use of this protective member 114 is shown in FIG. 5. This would also obviate the need for a clamp 116.

An additional variation of the protective member 114 includes a layer of dielectric and/or ESD dissipative material positioned in areas where the user grasps the protective member 114. One such material is KAPTON® XC polyimide film sold by DuPont.

Figure 6:
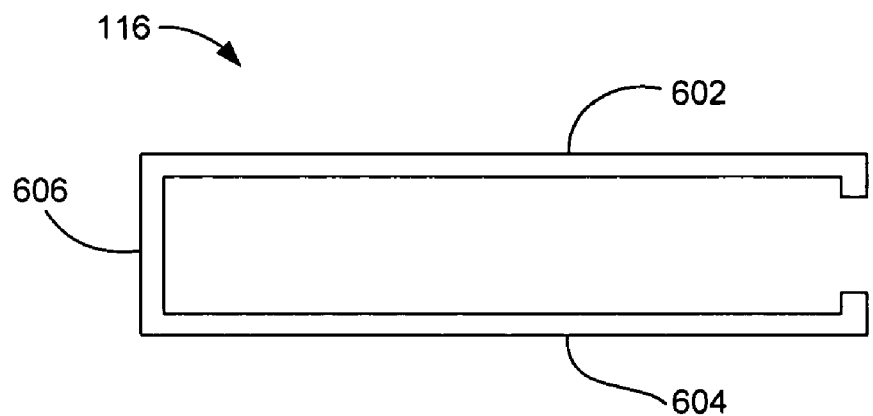
FIG. 6 is a side view of a clamp.

The clamp 116 can be formed of a substantially rigid material (i.e. plastic, etc.). Also, the clamp 116 may optionally be formed of a static dissipative or conductive material. In one embodiment, shown in FIG. 6, the clamp 116 may include a pair of substantially rectangular planar portions 602, 604 separated in a fixed spaced relationship with a substantially rectangular intermediate portion 606. Thus, the clamp 116 forms a substantially U-shaped cross-section along a length thereof.

Figure 7A:
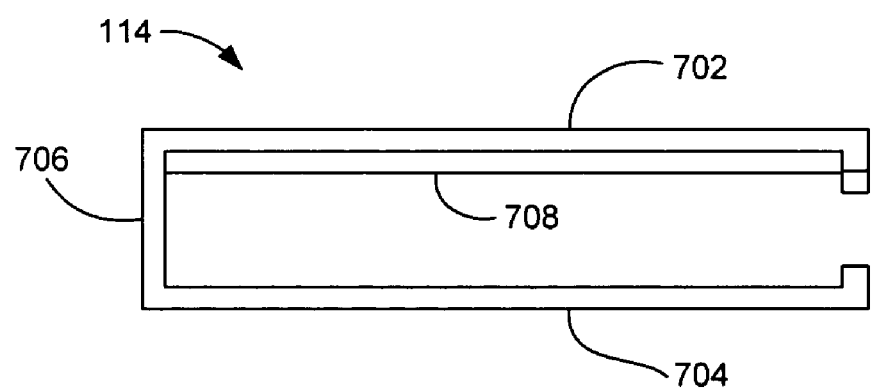
FIG. 7A is a side view of a protective member having a clamping portion.

FIG. 7A shows a protective member 114 having an integrated clamping portion. In this embodiment, the clamping portion can include a pair of parallel clamping arms 702, 704 coupled together by a connecting portion 706. A conductive portion 708 is coupled to one of the clamping arms 702. The conductive portion 708 engages the traces 707 of the cable 102 when the protective device 114 is clamped on the cable 102.

Figure 7B:
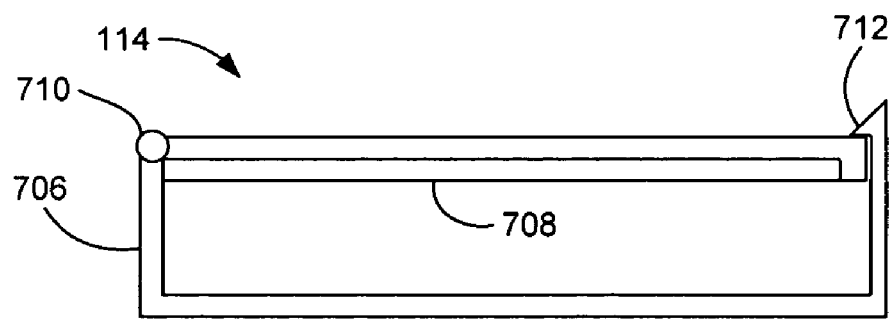
FIG. 7B is a side view of a variation of the protective member of FIG. 7A.

FIG. 7B depicts a variation on the protective device 114 shown in FIG. 7A, now including a hinge 710 and a catch 712 for locking the protective device 114 in a closed position (as shown).

Figure 8:
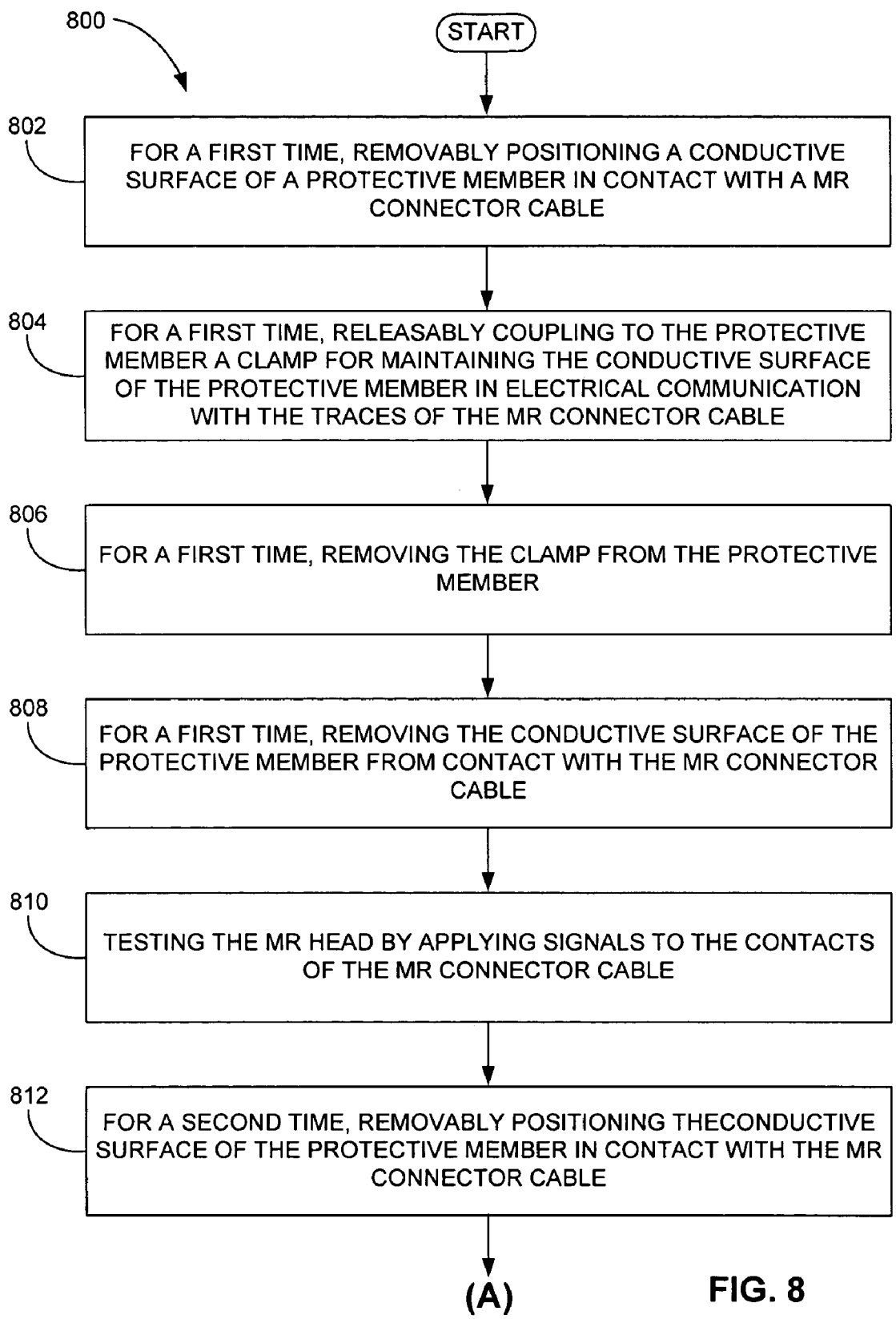
FIG. 8 illustrates a method for protecting a MR head from damage caused by electrostatic discharge.

FIG. 8 illustrates a method 800 for protecting a MR head from damage caused by ESD. As an option, the present method 800 may be implemented using any of the foregoing embodiments. Of course, the present method 800 may be implemented in any other desired context.

In operation 802, for a first time, a conductive surface of a protective member (see, for example, the embodiments described above) may be removably positioned in contact with a MR connector cable such that the conductive surface remains in electrical communication with the traces of the MR connector cable. Thus, the protective member may serve to protect a MR head coupled to the MR connector cable from damage caused by ESD.

Thereafter, for a first time, a clamp (see, for example, the embodiments described above) is releasably coupled to the protective member for maintaining the conductive surface of the protective member in electrical communication with the traces of the MR connector cable. Note operation 804. The clamp thus serves to facilitate the shorting of the traces to protect the MR head coupled to the MR connector cable from the damage caused by the ESD.

As an option, operations 802 and 804 may be performed prior to or immediately after the MR head is coupled to the MR connector cable, at which time the MR head is vulnerable to ESD damage during subsequent handling.

When one desires to test the MR head, the clamp may be removed from the protective member for a first time. See operation 806. Moreover, for a first time, the conductive surface of the protective member may be removed from contact with the MR connector cable, as indicated in operation 808. To this end, the MR head may be tested by applying signals to the contacts of the MR connector cable. See operation 810.

Then, for a second time, the conductive surface of the protective member may again be removably positioned in contact with the MR connector cable such that the conductive surface remains in electrical communication with traces of the MR connector cable for shorting the traces to protect the MR head coupled to the MR connector cable from damage caused by the ESD. See operation 812. Similarly, for a second time, the clamp may be releasably coupled to the protective member for maintaining the conductive surface of the protective member in electrical communication with the traces of the MR connector cable, as indicated in operation 814.

While in the protected state, the MR head may be coupled to a tape drive system during a manufacturing process, in operation 816. More information regarding one exemplary tape drive system will be set forth in greater detail during reference to FIG. 9.

Since the MR head is protected from ESD when installed in the tape drive system, the clamp may be removed from the protective member, and the conductive surface of the protective member may be removed from contact with the MR connector cable, as indicated in operations 818 and 820. At this point, the protective member and clamp may be used with another MR head and connector cable during the course of subsequent iterations of operations 802-820.

In operation 822, after removal of the protective member, a non-conductive mechanical cover may be attached over the exposed traces to protect them. Illustrative covers include nonconductive tape, paint or other coating, a clip, etc.

Figure 9:
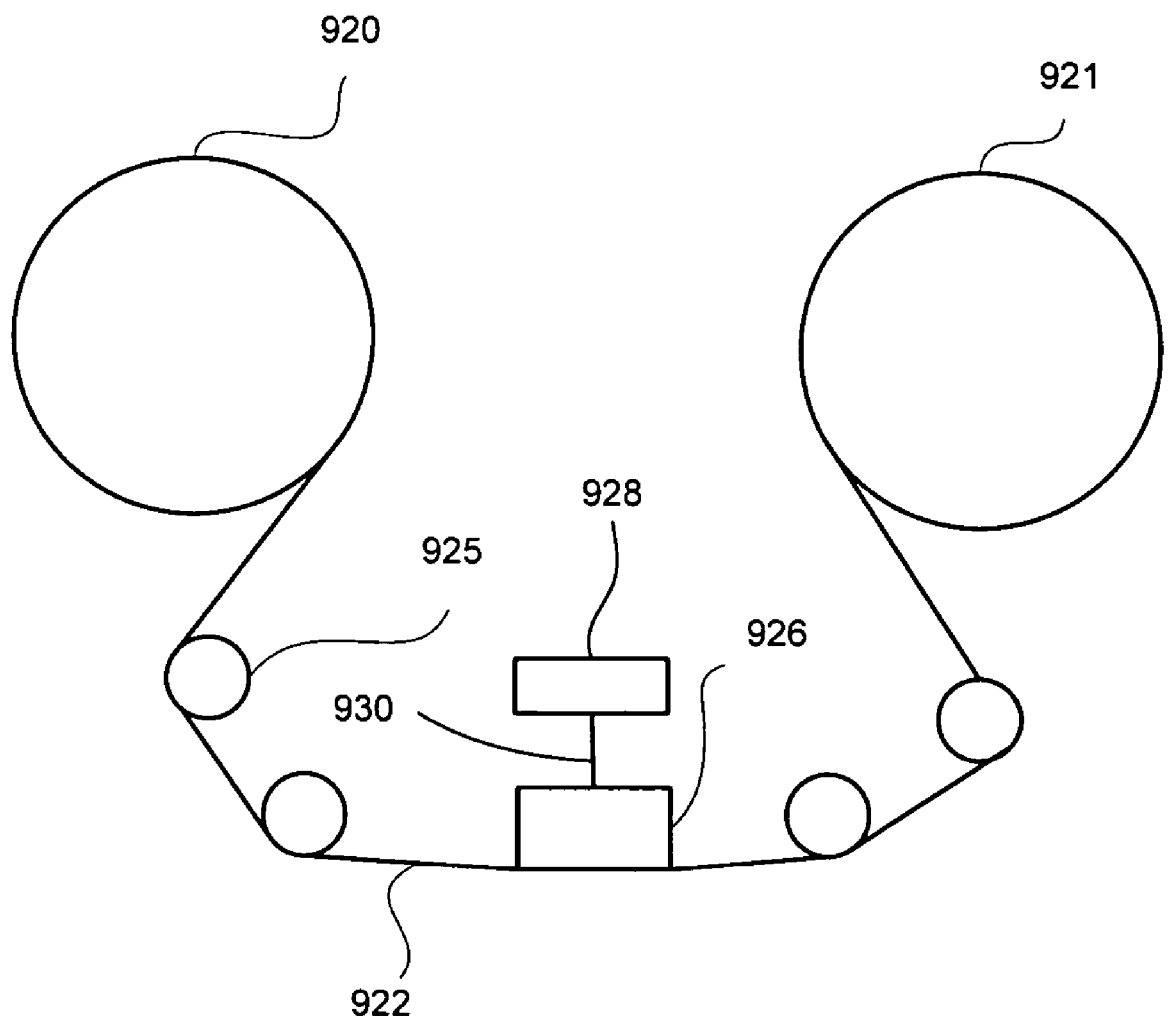
FIG. 9 illustrates a tape drive which may be employed in the context of the method of FIG. 8.

FIG. 9 illustrates a tape drive which may be employed in the context of the method 800 of FIG. 8. While one specific implementation of a tape drive is shown in FIG. 9, it should be noted that the embodiments of the previous figures may be implemented in the context of any type of drive (i.e. hard drive, tape drive, etc.)

As shown, a tape supply cartridge 920 and a take-up reel 921 are provided to support a tape 922. Moreover, guides 925 guide the tape 922 across a bidirectional tape head 926. Such bidirectional tape head 926 is in turn coupled to a control assembly 928 via a compression-type MR connector cable 930.

A tape drive, such as that illustrated in FIG. 9, includes drive motor(s) to drive the tape supply cartridge 920 and the take-up reel 921 to move the tape 922 linearly over the head 926. The tape drive also includes a read/write channel to transmit data to the head 926 to be recorded on the tape 922 and to receive data read by the head 926 from the tape 922. An interface is also provided for communication between the tape drive and a host to send and receive the data and for controlling the operation of the tape drive and communicating the status of the tape drive to the host, all as understood by those of skill in the art.

Figure 10:
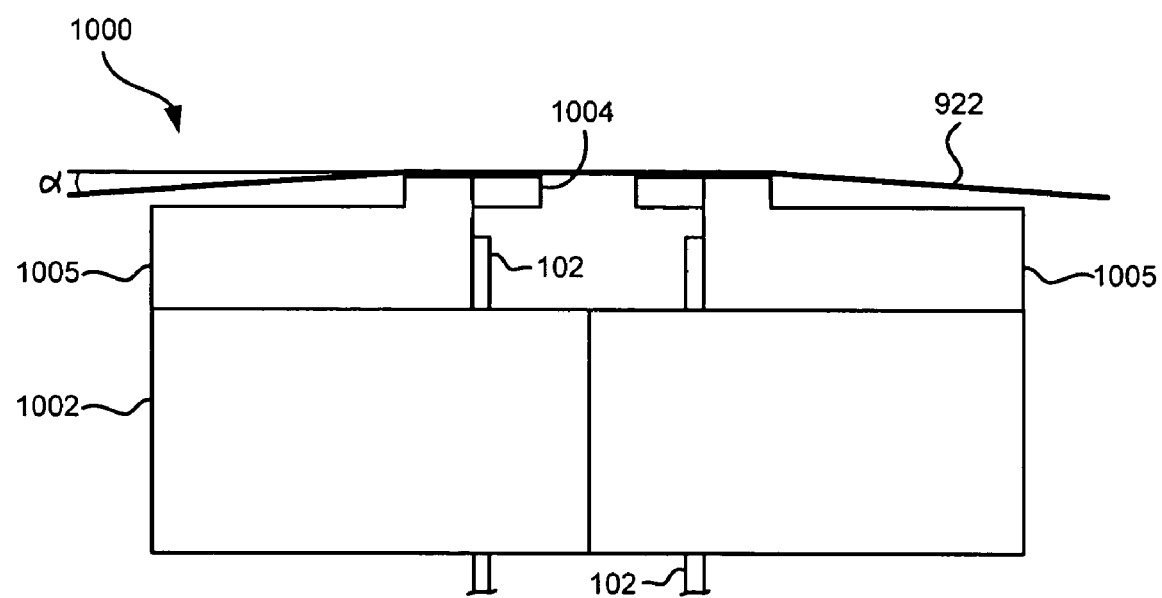
FIG. 10 is a partial side view of a tape head in use.

Prior art FIG. 10 illustrates a tape head in use. As shown, FIG. 10 illustrates a completed head for a read-while-write bidirectional linear tape drive. "Read-while-write" means that the read element follows behind the write element. This arrangement allows the data just written by the write element to be immediately checked for accuracy and true recording by the trailing read element. Specifically, in FIG. 10, a tape head 1000 comprising two modules 1005 are mounted on a ceramic substrate 1002 which are, in turn, adhesively or otherwise physically coupled. Each of the modules 1005 includes several read sensors and/or write transducers electrically coupled to pads (not shown) for subsequent attachment to external electronic devices. Closures 1004 are coupled to the modules 1005 to support the tape and protect the read/write elements from wear by the tape. Conductive wires in cables 102 are fixedly and electrically coupled to the pads. The tape 922 wraps over the modules 1005 at a predetermined wrap angle α.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for protecting an electronic device from damage caused by electrostatic discharge (ESD), comprising:
   a cable adapted for coupling to an electronic device, the cable having multiple traces therein adapted for electrical communication with components of the electronic device, the cable having opposite ends and a window therein positioned between the ends, portions of the traces being exposed in the window; and
   a protective member being insertable in the window of the cable, the protective member having a conductive portion engaging the portions of the traces of the cable when inserted in the window of the cable for creating a short between at least some of the traces.

2. A system as recited in claim 1, further comprising a clamp for detachably coupling the protective member to the cable.

3. A system as recited in claim 1, wherein the conductive portion includes a noncorrosive material.

4. A system as recited in claim 1, wherein the protective member is a solid bar of conductive material.

5. A system as recited in claim 1, wherein the protective member includes a nonconductive portion, the conductive portion being coupled to the nonconductive portion.

6. A system as recited in claim 1, wherein the conductive portion of the protective member is a noncorrosive material plated on a core.

7. A system as recited in claim 1, wherein the conductive portion of the protective member is a woven mesh.

8. A system as recited in claim 7, wherein the woven mesh is coupled to a resiliently deformable material.

9. A system as recited in claim 1, wherein the protective member includes an adhesive portion for adhering the protective member to the cable.

10. A system as recited in claim 1, wherein the protective member includes a layer of ESD dissipative material thereon.

11. A system as recited in claim 1, wherein the protective member includes an integrated clamping portion.

12. A system as recited in claim 11, wherein the protective member includes a hinge.

13. A system as recited in claim 12, wherein the protective member includes a catch for locking the protective member to the cable.

14. A system as recited in claim 1, wherein the electronic device is a magnetoresistive (MR) device.

15. A system for protecting a magnetoresistive (MR) device from damage caused by electrostatic discharge (ESD), comprising:

a cable coupled to a MR device, the cable having multiple traces therein and in electrical communication with the MR device, the cable having opposite ends and a window therein positioned between the ends, portions of the traces being exposed in the window; and a protective member being insertable in the window of the cable, the protective member having a conductive portion engaging the portions of the traces of the cable when inserted in the window of the cable for creating a short between at least some of the traces.

16. A system as recited in claim 15, further comprising a clamp for detachably coupling the protective member to the cable.

17. A system as recited in claim 15, wherein the conductive portion includes a noncorrosive material.

18. A system as recited in claim 15, wherein the protective member is a solid bar of conductive material.

19. A system as recited in claim 15, wherein the protective member includes a nonconductive portion, the conductive portion being coupled to the nonconductive portion.

20. A system as recited in claim 15, wherein the conductive portion of the protective member is a noncorrosive material plated on a core.

21. A system as recited in claim 15, wherein the conductive portion of the protective member is a woven mesh.

22. A system as recited in claim 21, wherein the woven mesh is coupled to a resiliently deformable material.

23. A system as recited in claim 15, wherein the protective member includes an adhesive portion for adhering the protective member to the cable.

24. A system as recited in claim 15, wherein the protective member includes a layer of ESD dissipative material thereon.

25. A system as recited in claim 15, wherein the protective member includes an integrated clamping portion.

26. A system as recited in claim 25, wherein the protective member includes a hinge.

27. A system as recited in claim 26, wherein the protective member includes a catch for locking the protective member to the cable.

28. A system for protecting a magnetoresistive (MR) device from damage caused by electrostatic discharge (ESD), comprising:

a cable coupled to a MR device, the cable having multiple traces therein and in electrical communication with the MR device, the cable having opposite ends and a window therein positioned between the ends, portions of the traces being exposed in the window;

a protective member being insertable in the window of the cable, the protective member having a conductive portion engaging the portions of the traces of the cable when inserted in the window of the cable for creating a short between at least some of the traces; and a clamp for detachably coupling the protective member to the cable, wherein the conductive portion includes a noncorrosive material.

29. A tape drive system, comprising:

a magnetic head;

a drive mechanism for passing a magnetic recording tape over the magnetic head;

a controller electrically coupled to the magnetic head for controlling a voltage of the conducting circuit of the magnetic head;

a cable coupling the controller to the magnetic head, the cable having a window therein positioned between opposite ends thereof; and a protective member being insertable in the window of the cable, the protective member having a conductive portion engaging traces of the cable exposed in the window when inserted in the window of the cable for creating a short between at least some of the traces.

30. A method for protecting an electronic device from damage caused by electrostatic discharge (ESD), comprising:

removably positioning a protective member in a window of a cable coupled to an electronic device, the protective member having a conductive portion engaging traces of the cable exposed in the window when inserted in the window of the cable for creating a short between at least some of the traces.

* * * * *